United States Patent
Ikuta

(10) Patent No.: US 6,456,954 B1
(45) Date of Patent: Sep. 24, 2002

(54) SENSING APPARATUS FOR DETECTING A PHYSICAL QUANTITY, INCLUDING MEMORY CIRCUITS STORING CHARACTERISTICS ADJUSTING DATA

(75) Inventor: Toshio Ikuta, Handa (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/512,274

(22) Filed: Feb. 24, 2000

(30) Foreign Application Priority Data

Feb. 24, 1999 (JP) ............................................ 11-046561

(51) Int. Cl.[7] ................................................. G01L 3/00
(52) U.S. Cl. ............................. 702/98; 702/58; 702/81; 702/90; 702/108; 702/124; 702/185
(58) Field of Search ............................... 702/33–36, 40, 702/57, 58, 59, 80, 81–84, 85, 90, 91, 93, 98, 104, 107, 108, 100, 116, 117, 118, 119, 122, 124, 127, 138, 140, 141, 170, 172, 182–185, 188, FOR 103, FOR 104, FOR 123–125, FOR 134, FOR 135, FOR 136, FOR 137, FOR 141, FOR 143, FOR 155–163, FOR 170, FOR 171; 365/207; 327/509, 511, 513, 517; 700/28, 77

(56) References Cited

U.S. PATENT DOCUMENTS

| 4,845,649 A | * | 7/1989 | Eckardt et al. ......... 364/571.02 |
| 5,062,062 A | * | 10/1991 | Nishibe et al. ............. 364/559 |
| 5,115,407 A | * | 5/1992 | Bird et al. ............. 364/551.01 |
| 5,255,202 A | * | 10/1993 | Kido et al. .................. 364/483 |
| 5,355,129 A | * | 10/1994 | Baumann ............... 340/870.04 |
| 5,365,768 A | * | 11/1994 | Suzuki et al. .................. 73/1 R |
| 5,396,247 A | | 3/1995 | Watanabe et al. ........... 241/157 |
| 5,449,897 A | * | 9/1995 | Bertelsen et al. ........... 250/207 |
| 5,525,899 A | * | 6/1996 | Watanabe et al. ........... 324/166 |
| 5,526,293 A | * | 6/1996 | Mozumder et al. ......... 364/578 |
| 5,604,684 A | * | 2/1997 | Juntunen ................ 364/571.04 |
| 5,629,880 A | * | 5/1997 | Negishi ....................... 364/579 |
| 5,661,669 A | * | 8/1997 | Mozumder et al. ......... 364/552 |
| 5,686,835 A | * | 11/1997 | Watanabe et al. ........... 324/552 |
| 5,693,936 A | * | 12/1997 | Komachiya et al. ... 250/227.17 |
| 5,812,427 A | * | 9/1998 | Nonoyama et al. ......... 364/566 |
| 6,082,196 A | * | 7/2000 | Nonoyama et al. ...... 73/514.18 |
| 6,154,087 A | * | 11/2000 | Ito .............................. 327/512 |

FOREIGN PATENT DOCUMENTS

| JP | 02181623 | * | 7/1990 |
| JP | 4-313020 | | 11/1992 |
| JP | 5-259907 | | 10/1993 |
| JP | 08185586 | * | 7/1996 |
| JP | 9-113310 | | 5/1997 |
| JP | 9-218118 | | 8/1997 |
| JP | 9-264798 | | 10/1997 |
| JP | 10-96743 | | 4/1998 |
| JP | 10188154 | * | 7/1998 |
| JP | 10-281912 | | 10/1998 |
| JP | 10-339673 | | 12/1998 |
| JP | 11-44585 | | 2/1999 |
| WO | WO94/27549 | * | 12/1994 |

* cited by examiner

Primary Examiner—Marc S. Hoff
Assistant Examiner—Carol S. Tsai
(74) Attorney, Agent, or Firm—Harness, Dickey & Pierce, PLC

(57) ABSTRACT

A sensing element detects a predetermined physical quantity and generates a sensor signal. A signal processing circuit processes the sensor signal and generates an output signal. A first memory circuit stores characteristics control data used for adjusting sensor output characteristics. An adjusting circuit performs an adjustment to equalize the sensor output to a target value based on the characteristics control data stored in the first memory circuit. A second memory circuit stores fine control data used in a fine adjustment performed to correct a deviation resulting after the adjustment based on the characteristics control data stored in said first memory circuit.

4 Claims, 2 Drawing Sheets

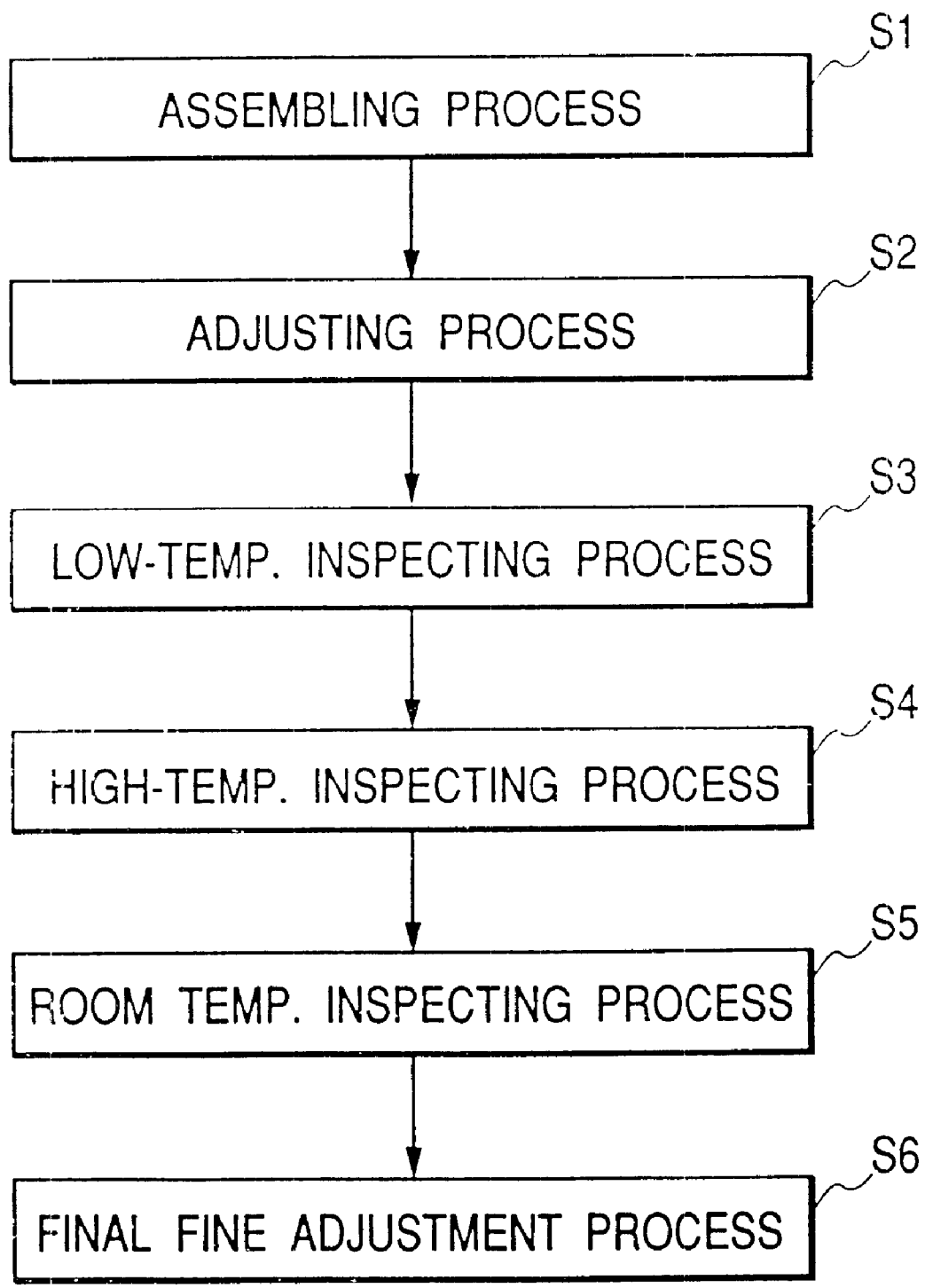

SENSING APPARATUS FOR DETECTING A PHYSICAL QUANTITY, INCLUDING MEMORY CIRCUITS STORING CHARACTERISTICS ADJUSTING DATA

BACKGROUND OF THE INVENTION

The present invention relates to a sensing apparatus capable of adjusting a sensor output to a target value.

To detect physical quantities such as pressure and acceleration, highly accurate sensors are recently required.

However, in the manufacturing processes of the sensing apparatus, the sensing element is subjected to various stresses (including thermal stresses). Thus, it is inevitable that the sensor output deviates from a predetermined design (or target) value. In other words, individual sensing apparatuses, after being manufactured, have sensor outputs inherently different from each other. In this respect, the sensor output is not accurate.

A conventional sensing apparatus includes a memory circuit which stores quantized data for sensor characteristics adjustment and an adjusting circuit which adjusts the sensor output to a target value based on the quantized data read out from the memory.

The quantized data for sensor characteristics adjustment are written to the memory circuit after the assembling processes of the sensing apparatus are completely finished.

Furthermore, to use or incorporate the sensing apparatus in an automotive vehicle, it is necessary to check the reliability and durability of the sensing apparatus in severe circumstances. To this end, the manufactured sensing apparatuses are usually inspected through high-temperature and low-temperature environment tests in addition to an ordinary room-temperature environment test.

The sensor output may deviate due to the influence of thermal hysteresis caused by the above-described high-temperature or low-temperature inspections.

Moreover, the sensor output of a highly sensitive sensing apparatus may cause a deviation due to delicate thermal hysteresis (regardless of execution of severe environment tests) or an installation stress (which may arise in the hardening process of an adhesive used to bond the sensing element).

In view of the foregoing, it is difficult to assure a sufficiently high sensor output.

SUMMARY OF THE INVENTION

An object of the present invention is to provide a sensing apparatus which is capable of generating a reliable and accurate sensor output.

In order to accomplish this and other related objects, the present invention provides a sensing apparatus comprising a sensing element for detecting a predetermined physical quantity and generating a sensor signal, a signal processing circuit for processing the sensor signal and generating an output signal, a first memory circuit for storing characteristics control data used for adjusting sensor output characteristics, an adjusting circuit for performing an adjustment of sensor characteristics based on the characteristics control data stored in the first memory circuit, and a second memory circuit for storing fine control data used in a fine adjustment performed to correct a deviation resulting after the adjustment based on the characteristics control data stored in the first memory circuit.

According to the circuit arrangement of the present invention, the signal processing circuit generates the output signal representing the sensor signal produced from the sensing element. The adjusting circuit performs the sensor characteristics adjustment based on the characteristics control data stored in the first memory circuit so as to adjust the sensor output to the target value.

Thus, after finishing a series of assembling processes of the sensing apparatus, it becomes possible to equalize the output signal level to the target value with reference to the characteristics control data stored in advance in the first memory circuit. The sensing accuracy is improved.

Furthermore, in addition to the first memory circuit, the present invention provides the second memory circuit which stores the fine control data used in a fine adjustment performed to correct a deviation resulting after the adjustment based on the characteristics control data stored in the first memory circuit.

For example, when the sensor output signal deviates largely from the target value, the fine control data is written to the second memory circuit so as to eliminate the deviation.

Accordingly, the present invention makes it possible to exclude or eliminate various deviations in the sensor output which are usually caused in the manufacturing processes. The sensor characteristics can be easily and surely optimized before shipping the sensing apparatus. This sufficiently increases the accuracy and reliability of the sensor output. The required memory size of the second memory circuit is quite small. The overall cost of the system can be reduced.

Preferably, the first memory circuit and the second memory circuit are separately arranged so that circuit elements of the first memory circuit are independent of circuit elements of the second memory circuit.

Preferably, an add-subtract circuit is provided for selectively adding or subtracting the fine control data stored in the second memory circuit to or from the characteristics control data stored in the first memory circuit.

Preferably, the memory size of the second memory circuit is smaller than that of the first memory circuit.

Another aspect of the present invention provides a first method for adjusting sensing characteristics of a sensing apparatus.

First of all, characteristics control data is stored in a first memory for adjusting sensor output characteristics. In the next step, sensor characteristics of the sensing apparatus is adjusted based on the characteristics control data stored in the first memory so as to equalize a sensor output to a target value. When the sensor output deviates from the target value, the fine control data is stored in a second memory. Then, a fine adjustment of the sensor characteristics is performed based on the fine control data stored in the second memory so as to eliminate a deviation of the sensor output from the target value.

Another aspect of the present invention provides a second method for adjusting sensing characteristics of a sensing apparatus.

In a first step, characteristics control data is stored in a main memory for adjusting sensor output characteristics. In a second step, sensor characteristics is adjusted based on the characteristics control data stored in the main memory so as to equalize a sensor output of the sensing apparatus to a target value. In a third step, a predetermined performance test is performed for shipment of the sensing apparatus. In a fourth step, it is checked whether the sensor output of the sensing apparatus remains within an allowable range with respect to the target value even after finishing the performance test. In a fifth step, fine control data is stored in an auxiliary memory when the sensor output is not within the allowable range. Finally, in a sixth step, a fine adjustment of the sensor characteristics is performed based on the fine control data stored-in the auxiliary memory so as to eliminate a deviation of the sensor output from the target value.

In the above first and second adjusting methods, it is preferable that the second (or auxiliary) memory is independent of the first (or main) memory. The fine control data stored in the second (or auxiliary) memory is selectively added or subtracted to or from the characteristics control data stored in the first (main) memory. The memory size of the second (auxiliary) memory is smaller than that of the first (main) memory.

BRIEF DESCRIPTION OF THE DRAWINGS

The above and other objects, features and advantages of the present invention will become more apparent from the following detailed description which is to be read in conjunction with the accompanying drawings, in which:

FIG. 2 is a flowchart showing the content of manufacturing, inspecting, and adjusting processes in accordance with the preferred embodiment of the present invention.

DESCRIPTION OF THE PREFERRED EMBODIMENT

Figure 1:
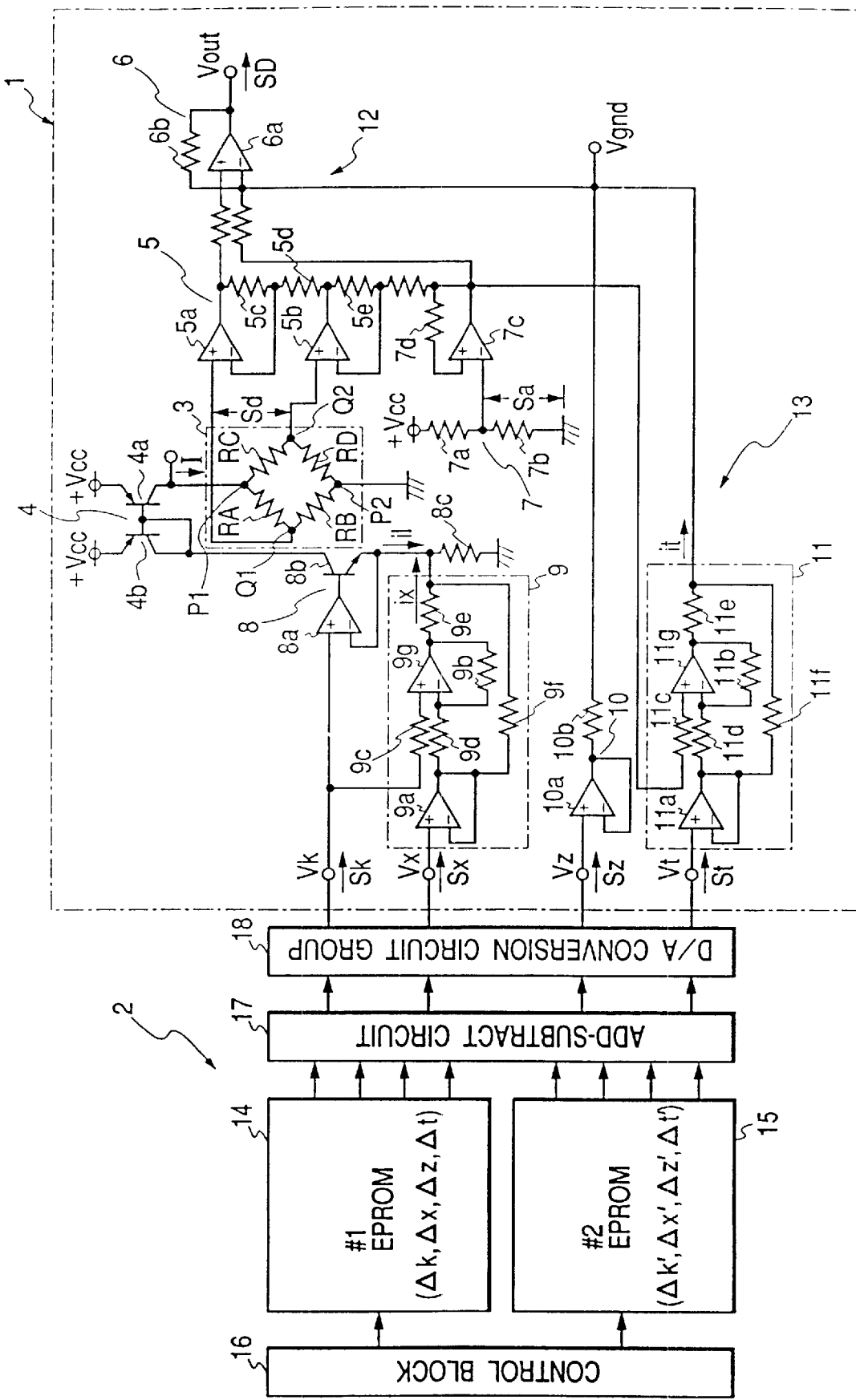
FIG. 1 is a circuit diagram showing an overall arrangement of a semiconductor pressure sensing apparatus in accordance with a preferred embodiment of the present invention.

A preferred embodiment of the present invention will be explained hereinafter with reference to attached drawings.

FIG. 1 is a circuit diagram showing an overall arrangement of a semiconductor pressure sensing apparatus in accordance with a preferred embodiment of the present invention. A sensing section 1 detects a pressure (i.e., a predetermined physical quantity to be measured). A data generating section 2, serving as a pre-stage of the sensing section 1, generates the data necessary to adjust the sensitivity of the sensing section 1 as well as the zero offset of the sensor output of the sensing section 1.

The sensing section 1 comprises a plurality of input terminals Vk, Vx, Vz, and Vt. The first input terminal Vk receives a first voltage signal Sk. The sensitivity of the sensing section 1 is adjustable in accordance with the first voltage signal Sk. The second input terminal Vx receives a second voltage signal Sx. The temperature characteristics of the sensitivity of the sensing section 1(i.e., sensor sensitivity) is adjustable in accordance with the second voltage signal Sx. The third input terminal Vz receives a third voltage signal Sz. The zero offset of the sensor output of the sensing section 1 is adjustable in accordance with the third voltage signal Sz. The fourth input terminal Vt receives a fourth voltage signal St. The temperature characteristics of the zero offset of the sensing circuit 1 is adjustable in accordance with the fourth voltage signal St.

The sensing section 1 is made of a semiconductor chip (e.g., silicon monocrystal) having a large piezoelectric-resistance coefficient. The sensing section 1 comprises a pressure detecting bridge circuit 3 which detects a pressure applied to this circuit.

More specifically, the pressure detecting bridge circuit 3 comprises a total of four piezoelectric resistive elements (i.e., diffused resistance elements) RA, RB, RC and RD which are formed on a diaphragm of a semiconductor chip and arranged in a full bridge connecting pattern. The resistance value of each of resistive elements RA and RD decreases in response to the pressure applied on the diaphragm as a physical quantity to be measured. The resistance value of each of resistive elements RB and RC increases in response to the pressure applied on the diaphragm.

The pressure detecting bridge circuit 3 is connected to a constant-voltage power supply terminal +Vcc via a PNP transistor 4a which constitutes part of a current mirror circuit 4. An input terminal P1 of pressure detecting bridge circuit +Vcc. Another input terminal P2 of pressure detecting bridge circuit 3 is grounded.

Accordingly, one output terminal Q1 (i.e., a joint point of resistive elements RA and RB) of pressure detecting bridge circuit 3 has an electric potential increasing in proportion to the applied pressure. The other output terminal Q2 (i.e., a joint point of resistive elements RC and RD) of pressure detecting bridge circuit 3 has an electric potential decreasing in proportion to the applied pressure. Thus, a sensor signal Sd having a signal quantity (i.e., voltage level) corresponding to the applied pressure is detectable between two output terminals Q1 and Q2.

In addition to the above-described current mirror circuit 4, the sensing section 1 comprises the following analog circuit components which are formed on a semiconductor chip different from the semiconductor chip of the pressure detecting bridge circuit 3.

A high input impedance differential amplification circuit 5 comprises operational amplifiers 5a, 5b and resisters 5c, 5d and 5e. The sensor signal Sd generated from the pressure detecting bridge circuit 3 is amplified by the high input impedance differential amplification circuit 5. The amplified sensor signal Sd is sent to a correction circuit 6 which consists of an operational amplifier 6a and a feedback resister 6b. The correction circuit 6 amplifies the received sensor signal Sd and produces a data signal SD having a voltage level representing the resultant output from an output terminal Vout. The signal amount of data signal SD represents a potential difference between the output terminal and the inverting input terminal of the operational amplifier 6a.

The reference voltage generating circuit 7 generates an output signal based on a reference signal Sa of a constant voltage level regardless of the pressure applied to the pressure detecting bridge circuit 3 as well as the temperature of the pressure detecting bridge circuit 3. The reference voltage generating circuit 7 comprises two resisters 7a and 7b serially connected between the power supply terminal #Vcc and the ground (GND) terminal. The reference voltage generating circuit 7 further comprises an operational amplifier 7c having an inverting input terminal connected to a joint of two resisters 7a and 7b. An output terminal of operational amplifier 7c is connected to a non-inverting input terminal of operational amplifier 7c via a feedback resister 7d.

The output signal based on the reference signal Sa, produced from the operational amplifier 7c, is given to the operational amplifier 6a in the correction circuit 6. Errors caused by dispersion or non-uniformity of circuit constants or the like are correctable in accordance with the given signal based on the reference signal Sa.

According to the circuit arrangement shown in FIG. 1, the output terminal of the reference voltage generating circuit 7 is serially connected to the lowest-voltage terminal of the differential amplification circuit 5. Thus, the amplified output voltage level of the differential amplification circuit 5 is raised by an amount equivalent to the output voltage of the reference voltage generating circuit 7.

A voltage-current conversion circuit 8 controls the mirror current of the current mirror circuit 4 to a predetermined level. The voltage-current conversion circuit 8 comprises an operational amplifier 8a, an NPN transistor 8b, and a resister 8c. The operational amplifier 8a has a non-inverting input terminal receiving the first voltage signal Sk entered through the first input terminal Vk for adjusting the sensor sensitivity. The NPN transistor 8b has a base terminal connected to the output terminal of the operational amplifier 8a. The resister 8c is connected between the emitter terminal of NPN transistor 8b and the ground (GND) terminal. The emitter terminal of NPN transistor 8b is connected to an inverting input terminal of the operational amplifier 8a.

The current mirror circuit 4 includes a PNP transistor 4b in addition to the PNP transistor 4a. The collector current of PNP transistor 4b flows across the transistor 8b and the resistor 8c.

Thus, the voltage-current conversion circuit 8 functions as a means for controlling the current "i1" flowing across transistor 8b and resister 8c in accordance with the first voltage signal Sk given to the operational amplifier 8a. The current mirror circuit 4 produces the current I proportional to the current "i1." The pressure detecting bridge circuit 3 receives the current I produced from the current mirror circuit 4.

Accordingly, the sensor sensitivity of the pressure detecting bridge circuit 3 is adjustable by controlling the signal level of the first voltage signal Sk given to the first input terminal Vk from the data generating section 2.

A first temperature detecting circuit 9 comprises an operational amplifier 9a having a non-inverting input terminal receiving the second voltage signal Sx entered from the second input terminal Vx for correcting the temperature characteristics of the sensor sensitivity. The operational amplifier 9a has an output terminal connected to an inverting input terminal of an operational amplifier 9g. The operational amplifier 9g has a non-inverting input terminal connected via a resister 9c to the first input terminal Vk. An inverting input terminal of the operational amplifier 9g is connected via a resister 9d to the output terminal of the operational amplifier 9a. The operational amplifier 9g has an output terminal connected via a resister 9b to its inverting terminal. The output terminal of the operational amplifier 9g is also connected via resisters 9e and 9f to the output terminal of the operational amplifier 9a.

The resister 9b, serving as a feedback resister of the operational amplifier 9g, is a temperature compensating resister (e.g., diffused resister) having temperature characteristics. The resisters 9c to 9f are resisters having no temperature characteristics. For example, the resisters 9c to 9f are made of CrSi which has a temperature coefficient of approximately 0. The resistance values of resistors 9c to 9f are set in such a manner that the output current "ix" of the first temperature detecting circuit 9 becomes equal to 0 at a predetermined reference temperature.

In the first temperature detecting circuit 9, the operational amplifier 9a constitutes a voltage follower. When the second voltage signal Sx enters through the second input terminal Vx, the operational amplifier 9a controls the current flowing into the first temperature detecting circuit 9 to a level corresponding to the second voltage signal Sx.

When the temperature of the sensing section 1 differs from the above reference temperature, the output current "ix" of the first temperature detecting circuit 9 is not 0 (ix≠0). In other words, the a significant amount of current "ix" flows across the resister 8c.

The current mirror circuit 4 corrects the current I flowing into the pressure detecting bridge circuit 3 in accordance with the current "ix." Accordingly, the temperature characteristics of the sensitivity of bridge circuit 3 is correctable by controlling the signal level of the second voltage signal Sx given to the second input terminal Vx from the data generating section 2.

A voltage input circuit 10 comprises an operational amplifier 10a having a non-inverting terminal connected to the third input terminal Vz which receives the third voltage signal Sz used for adjusting the zero offset of the sensor output of sensing section 1. The operational amplifier 10a has an output terminal connected to its inverting input terminal. The output terminal of the operational amplifier 10a is connected to the reference voltage terminal Vgnd via a resister 10b.

In the voltage input circuit 10, the operational amplifier 10a constitutes a voltage follower. When the third voltage signal Sz enters through the third input terminal Vz, the operational amplifier 10a controls the current flowing into the voltage input circuit 10 to a level corresponding to the third voltage signal Sz. This current flows across the resister 10b and is supplied to the reference voltage terminal Vgnd and also to the feedback resister 6b of the correction circuit 6.

The voltage level of data signal SD, generated from the output terminal Vout of correction circuit 6, varies in response to the entered current. Accordingly, the zero offset of the sensor output (i.e., data signal SD) is adjustable by controlling the signal level of the third voltage signal Sz given to the third input terminal Vz from the data generating section 2.

A second temperature detecting circuit 11 comprises an operational amplifier 11a having a non-inverting input terminal receiving the fourth voltage signal St entered from the fourth input terminal Vt for correcting the temperature characteristics of the zero offset of the sensor output. The operational amplifier 11a has an output terminal connected to an inverting input terminal of an operational amplifier 11g. The operational amplifier 11g has a non-inverting input terminal connected via a resister 11c to the output terminal of the operational amplifier 7c of the reference voltage generating circuit 7. An inverting input terminal of the operational amplifier 11g is connected via a resister 11d to the output terminal of the operational amplifier 11a. The operational amplifier 11g has an output terminal connected via a resister 11b to its inverting terminal. The output terminal of the operational amplifier 11g is also connected via resisters 11e and 11f to the output terminal of the operational amplifier 11a.

The resister 11b, serving as a feedback resister of the operational amplifier 11g, is a temperature compensating resister (e.g., diffused resister) having temperature characteristics. The resisters 11c to 11f are resisters having no temperature characteristics. For example, the resisters 11c to 11f are made of CrSi which has a temperature coefficient of approximately 0. The resistance values of resistors 11c to 11f are set in such a manner that the output current "it" of the second temperature detecting circuit 11 becomes equal to 0 at the predetermined reference temperature.

In the second temperature detecting circuit 11, the operational amplifier 11a constitutes a voltage follower. When the fourth voltage signal St enters through the fourth input terminal Vt, the operational amplifier 11a controls the current flowing into the second temperature detecting circuit 11 to a level corresponding to the fourth voltage signal St.

When the temperature of the sensing section 1 differs from the above reference temperature, the output current "it" of the second temperature detecting circuit 11 is not 0 (it≠0). In other words, a significant amount of current "it" flows across the resister 11e.

The current "it" is supplied to the reference voltage terminal Vgnd and also to the feedback resister 6b of the correction circuit 6. The voltage level of data signal SD, generated from the output terminal Vout of correction circuit 6, varies in response to the entered current. Accordingly, the zero offset of the sensor output (i.e., data signal SD) is adjustable by controlling the signal level of the fourth voltage signal St given to the fourth input terminal Vt from the data generating section 2.

The above-described current mirror circuit 4, the differential amplification circuit 5, the correction circuit 6 and the reference voltage generating circuit 7 cooperatively constitute a signal processing circuit 12. The signal processing circuit 12 amplifies the sensor signal Sd produced from the pressure detecting bridge circuit 3 and generates the data signal SD having an analog voltage value from its output terminal Vout.

The above-described voltage-current conversion circuit 8, the first temperature detecting circuit 9, and the second temperature detecting circuit 11 cooperatively constitute an adjusting circuit 13. The adjusting circuit 13 performs the adjustment processing based on the voltage signals Sk, Sx, Sz and St given from the data generating section 2 so as to control the signal amount of data signal SD to a predetermined target value.

The data generating section 2 has the following arrangement.

A first EPROM 14, serving as a first memory circuit, stores quantized data Δk, Δx, Δz, and Δt (i.e., characteristics control data) used for adjusting the sensor characteristics. The characteristics control data Δk, Δx, Δz, and Δt have a predetermined data volume (e.g., 12 bits at maximum) for setting the value or level of the voltage signals Sk, Sx, Sz, and St.

A second EPROM 15 is independent of the first EPROM 14. The second EPROM 15, serving as a second memory circuit, stores quantized data Δk', Δx', Δz', and Δt' (i.e., fine control data) used for finely adjusting the sensor characteristics. The fine control data Δk', Δx', Δz', and Δt', having a predetermined data volume (e.g., 3 bits at maximum), are added to or subtracted from the corresponding characteristic control data Δk, Δx, Δz, and Δt, respectively.

A control block 16 performs the data writing/reading control for writing and reading data to and from the EPROMs 14 and 15.

An add-subtract circuit 17 adds or subtracts the fine control data Δk', Δx', Δz', and Δt' read from the second EPROM 15 to or from the corresponding characteristics control data Δk, Δx, Δz, and Δt read from the first EPROM 14.

A D/A conversion circuit group 18 converts the digital data of the resultant calculation output of the add-subtract circuit 17 into analog signals and sends them to respective input terminals Vk, Vx, Vz, and Vt.

The voltage level of respective voltage signals Sk, Sx, Sz and St given to the input terminals Vk, Vx, Vz, and Vt of the sensing section 1 is changeable in a wide range based on the characteristics control data Δk, Δx, Δz, and Δt stored in the first EPROM 14.

Furthermore, the voltage level of respective voltage signals Sk, Sx, Sz and St is finely adjustable based on the fine control data Δk', Δx', Δz', and Δt'.

The writing operation of the quantized data Vk, Vx, Vz, Vt and Δk', Δx', Δz', Δt' to the first and second EPROMs 14 and 15 is performed during the manufacturing process of the semiconductor pressure sensing apparatus.

FIG. 2 schematically shows the manufacturing, inspecting, and adjusting processes of the semiconductor pressure sensing apparatus.

Step S1 performs a series of assembling processes which are necessary to completely assemble the semiconductor pressure sensing apparatus.

Step S2 performs an adjustment process for writing characteristics control data Δk, Δx, Δz, and Δt to the first EPROM 14. The values of characteristics control data Δk, Δx, Δz, and Δt are set in such a manner that the data signal SD having an analog voltage value produced from the signal processing circuit 12 is equalized to the target value (i.e., design value).

Through this adjustment, not only the sensor sensitivity and its temperature characteristics are correctable but also the zero offset of the sensor output and its temperature characteristics are correctable. Thus, it becomes possible to improve the sensing accuracy for detecting the pressure applied to the pressure sensing bridge circuit 3.

Then, various inspections are performed successively for shipment of the manufactured pressure sensing apparatus.

Step S3 performs a low-temperature inspecting process for inspecting the sensor output characteristics at a predetermined low temperature environment.

Step S4 performs a high-temperature inspecting process for inspecting the sensor output characteristics at a predetermined high temperature environment.

Step S5 performs a room-temperature inspecting process for inspecting the sensor output characteristics at a predetermined room temperature environment.

In the step S5, it is checked whether the signal level of the data signal SD is within a predetermined allowable range with respect to the initial set value (i.e., the target value being set at the step S2). When an inspected semiconductor pressure sensing apparatus has a non-allowable signal level, step S5 picks up such a non-acceptable semiconductor pressure sensing apparatus.

Step S6 performs a final fine adjustment process for every semiconductor pressure sensing apparatuses which is picked up in the step S5.

More specifically, in the step S6, the fine control data Δk', Δx', Δz', and Δt' are written to the second EPROM 15. The values of fine control data Δk', Δx', Δz', and Δt' are set in such a manner that the deviation of data signal SD from the initial set value is eliminated or reduced to 0.

For example, it is assumed that the quantized data Δz of "525 (decimal value)" is set for the zero offset adjustment and an offset adjustment voltage is 1 mV per bit of the quantized data Δz. In this case, if the deviation of the signal level of the data signal SD is 5 mV in the room-temperature inspecting process of step S5, the final fine adjustment process of step S6 is performed to write the fine control data Δz' of "5 (decimal value)" to the second EPROM 15. As a result, an overall quantized data for the zero offset adjustment becomes "530(=525#5)."

In this manner, the semiconductor pressure sensing apparatus of the above-described embodiment comprises the second EPROM 15 in addition to the first EPROM 14. The first EPROM 14 stores the characteristics control data required for setting the target value of the sensor output (i.e., data signal SD). The second EPROM 15 stores the fine control data required for correcting the later resultant deviation of the sensor output from the set value (i.e., the target).

According to the arrangement of the above-described embodiment, it becomes possible to exclude or eliminate various deviations in the sensor output. It becomes possible to easily and surely optimize the sensor characteristics before shipping the sensing apparatus. This sufficiently increases the accuracy of the sensor output.

Furthermore, providing the second EPROM 15 (i.e, additional EPROM) separately from first EPROM 14 is advantageous in that a long-time erasing operation using the ultraviolet ray and a succeeding rewriting operation are no longer required for the first EPROM 14. This significantly reduces the overall manufacturing, inspecting, and adjusting time.

Once the sensitivity adjustment and the zero offset adjustment are finished in the above-described step S2, the deviation of sensor output becomes very small compared with the deviation caused in the manufacturing processes of the semiconductor pressure sensing apparatus. Thus, the data volume (e.g., 2–3 bits) for the fine control data $\Delta k'$, $\Delta x'$, $\Delta z'$, and $\Delta t'$ is very small compared with the data volume (e.g., 10 bits) for the characteristics control data $\Delta k$, $\Delta x$, $\Delta z$, and $\Delta t$. In other words, the required memory size of the second EPROM 15 is small. The overall cost of the system can be reduced.

The present invention is not limited to the above-disclosed embodiment, and can therefore be modified variously.

It is possible to integrate the signal processing circuit 12 and the adjusting circuit 13. For example, the sensor signal Sd produced from the pressure sensing bridge circuit 3 can be directly, or through an amplification circuit, sent to an A/D conversion circuit to obtain a digital sensor signal. In this case, the obtained digital sensor signal can be processed in a microcomputer (i.e., a digital calculating circuit) which is functionally equivalent to the signal processing circuit 12 and the adjusting circuit 13. Namely, the signal processing circuit 12 and the adjusting circuit 13 is replaceable by a digital calculating circuit.

The form of sensor signal, representing a signal amount of the physical quantity to be measured, is not limited to a voltage value (i.e., the sensor signal Sd having an analog voltage value). For example, it is possible to obtain the sensor signal as a time signal (i.e., which is represented by period of pulse or frequency).

The sensing object of the sensing element is not limited to the pressure. It is possible to detect other physical quantities, such as acceleration, angular velocity, torque, speed, magnetic flux, moisture, flow rate, density, concentration etc.

EPROMs, serving as the first and second (or main and auxiliary) memory circuits, are replaceable by other nonvolatile memories such as flash memories.

This invention may be embodied in several forms without departing from the spirit of essential characteristics thereof. The present embodiment as described is therefore intended to be only illustrative and not restrictive, since the scope of the invention is defined by the appended claims rather than by the description preceding them. All changes that fall within the metes and bounds of the claims, or equivalents of such metes and bounds, are therefore intended to be embraced by the claims.

What is claimed is:

1. A method for adjusting sensing characteristics of a sensing apparatus comprising the steps of:

storing characteristics control data in a main memory for adjusting sensor output characteristics;

adjusting sensor characteristics based on said characteristics control data stored in said main memory so as to equalize a sensor output of the sensing apparatus to a target value;

performing a predetermined performance test for shipment of the sensing apparatus;

checking whether the sensor output of the sensing apparatus remains within an allowable range with respect to said target value even after finishing said performance test;

storing fine control data in an auxiliary memory when the sensor output is not within said allowable range; and performing a fine adjustment of the sensor characteristics based on said fine control data stored in said auxiliary memory so as to eliminate a deviation of said sensor output from said target value.

2. The adjusting method in accordance with claim 1, wherein said auxiliary memory is independent of said main memory.

3. The adjusting method in accordance with claim 1, wherein said fine control data stored in said auxiliary memory is selectively added or subtracted to or from said characteristics control data stored in said main memory.

4. The adjusting method in accordance with claim 1, wherein the memory size of said auxiliary memory is smaller than that of said main memory.

* * * * *